United States Patent [19]

Ku et al.

[11] 3,887,994

[45] June 10, 1975

[54] METHOD OF MANUFACTURING A SEMICONDUCTOR DEVICE

[75] Inventors: San-Mei Ku, Poughkeepsie; Charles A. Pillus, Wappingers Falls, both of N.Y.

[73] Assignee: International Business Machines Corporation, Armonk, N.Y.

[22] Filed: June 29, 1973

[21] Appl. No.: 375,295

[52] U.S. Cl. ....................... 29/571; 29/584; 29/590; 148/1.5; 357/91

[51] Int. Cl. ...... B01j 17/00; H01l 7/54; H01l 11/14

[58] Field of Search ....... 250/492 A; 29/576 B, 571, 29/578, 584, 585, 590; 317/235, 48.9; 148/1.5

[56] References Cited

UNITED STATES PATENTS

| | | | |
|---|---|---|---|
| 3,515,956 | 6/1970 | Martin et al. | 148/1.5 |
| 3,600,797 | 8/1971 | Bower et al. | 29/576 B |
| 3,682,729 | 8/1972 | Gukelberger et al. | 250/492 A |
| 3,736,192 | 5/1973 | Tokuyama et al. | 148/1.5 |
| 3,747,203 | 7/1973 | Shannon | 29/578 |
| 3,756,861 | 9/1973 | Payne et al. | 148/1.5 |

*Primary Examiner*—Roy Lake
*Assistant Examiner*—Craig R. Feinberg
*Attorney, Agent, or Firm*—Frank C. Leach; Daniel E. Igo; Wesley DeBruin

[57] ABSTRACT

Non-doping ions are implanted in the electrode layer of a semiconductor to reduce contamination of the electrode layer by mobile ions. The dosage of the ions is selected to prevent an increase in the fast surface state density when the ions are implanted. The energy level at which the ions are implanted is controlled to position all of the implanted ions within the electrode layer.

13 Claims, 3 Drawing Figures

METHOD OF MANUFACTURING A SEMICONDUCTOR DEVICE

In the manufacture of semiconductor devices, particularly field effect transistors (FETs), contamination of the metallurgy by mobile ions, which are alkaline metal ions such as sodium ions, for example, is one of the main problems in fabrication of a stable device. The presence of the mobile ions in an FET produces threshold voltage instability and parasitic leakage between devices on the same chip.

Efforts to prevent contamination of the metallurgy of FETs by mobile ions have included constant cleaning of the evaporator system since the high temperatures to which the evaporator system is subjected results in outgassing that causes sodium ions, for example, to enter the metal film of aluminum or aluminum-copper, for example. Notwithstanding the constant and tedious cleaning of the evaporator system, there is no assurance that the metal film is free of mobile ions. Accordingly, the problem of mobile ions contaminating the metallurgy of a semiconductor device, particularly an FET, has increased the cost of production by causing the number of satisfactory FETs to be substantially low.

The present invention satisfactorily solves the foregoing problems by providing a method in which the metallurgy of a semiconductor device, particularly an FET, is free of mobile ions (By stating that the metallurgy is free of mobile ions, it is meant that the level of the mobile ions is not electrically measurable so that any mobile ions in the metallurgy do not affect the electrical characteristics of the devices.). Thus, stable FETs can be produced by the method of the present invention with the manufacturing cost being reduced in comparison with the previously available methods for producing satisfactory FETs.

The present invention solves the problems by implanting non-doping ions into the metallurgy, either before or after annealing, with a controlled energy level to position all of the ions within the metal film. It also is necessary to control the dosage of the ions to prevent an increase in the fast surface state density between the metal electrode layer and the insulating layer over which the electrode layer is disposed.

It is not known whether the elimination of the mobile ions is due to the presence of the non-doping ions in the crystal lattice structure of the metallurgy or whether it is due to the damage produced in the crystal lattice structure of the metallurgy by the implantation of the ions. It has been found that removal of all the damage to the crystal lattice structure of the metal electrode layer by the implantation of the ions results in the mobile ions again being present in sufficient quantity to be electrically measurable and to affect the electrical characteristics of the semiconductor device. Since the absence of damage to the crystal lattice structure requires annealing at a very high temperature such as 800° C., for example, the implanted ions such as hydrogen ions, for example, are very diffusive at this temperature. Thus, it is not known whether the diffusivity of the implanted ions or the absence of the damage to the crystal lattice structure of the metal electrode layer causes the sodium ions to become mobile again.

An object of this invention is to provide a method of reducing or eliminating mobile ions in a metal film of a semiconductor device, particularly an FET.

Another object of this invention is to provide a method for producing a stable FET.

The foregoing and other objects, features, and advantages of the invention will be more apparent from the following more particular description of a preferred embodiment of the invention, as illustrated in the accompanying drawing.

The method of the present invention contemplates implanting ions other than ions from groups III and V within a metal film overlying an insulating layer formed on a semiconductor substrate with the metal film having contact with at least one portion of the substrate to form an electrode layer. The insulating layer can be silicon dioxide so that the device is an MOS device or a layer of silicon dioxide overlying the substrate and a layer of silicon nitride overlying the silicon dioxide layer so that the device is an MNOS device. The present invention can be employed with any MIS (metal insulated semiconductor) device.

Suitable examples of ions for implantation include hydrogen, helium, silicon, neon, argon, carbon, aluminum, nitrogen, oxygen, copper, gold, xenon, and krypton. The energy level at which the ions are implanted in the metal film depends upon the thickness of the metal film since it is desired for all of the ions to be implanted within the metal film. For example, the energy required to implant hydrogen ions in an aluminum film having a thickness of 1,000 A is 4.5 keV. If helium ions are implanted in the aluminum film of 1,000 A, then the energy required is 6.5 keV. With silicon ions, the energy is approximately 45 keV for the aluminum film having a thickness of 1,000 A. The various energy levels for each of the aforementioned ions for different thicknesses are disclosed in "Projected Range Statistics in Semiconductors" by W. S. Johnson and J. F. Gibbons and published by Stanford University Bookstore in 1970.

The ions can be implanted in the metal film either before or after the metal film is etched to produce the metal electrode layers. However, it is preferred that the ions be implanted after etching of the metal film since this reduces the etching problems when silicon ions are implanted, for example.

Figure 1:
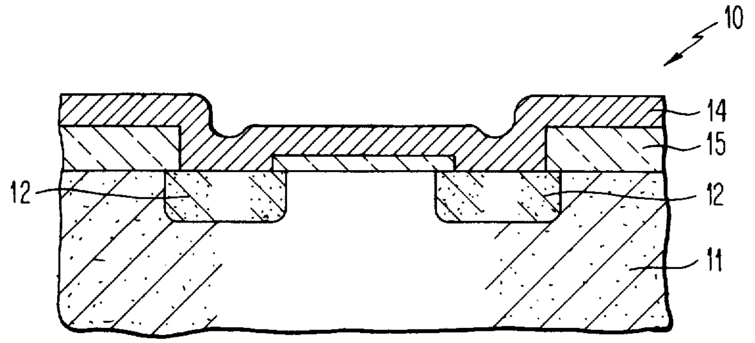
FIG. 1 is a fragmentary sectional view of a field effect transistor having a metal film.

Referring to the drawing and particularly FIG. 1, there is shown a semiconductor device 10, which is a field effect transistor, having a silicon substrate 11 with regions 12, i.e. source and drain, of opposite conductivity type formed therein by any suitable means. A metal film 14, which may be aluminum or aluminum-copper, for example, is deposited over an insulating layer 15 of the substrate 11 as shown in FIG. 1. The insulating layer 15 can be silicon dioxide or silicon nitride and silicon dioxide, for example.

Figure 2:
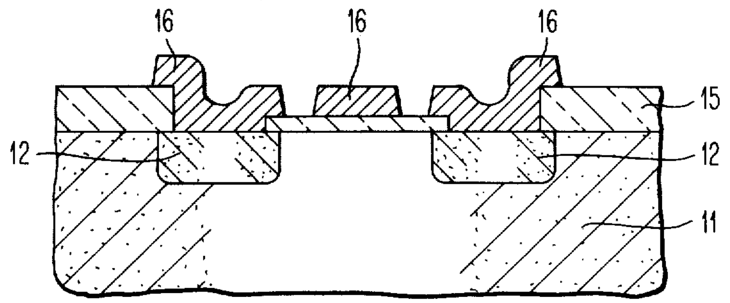
FIG. 2 is a fragmentary sectional view of the field effect transistor of FIG. 1 with its metal film etched to form electrode layers.
Figure 3:
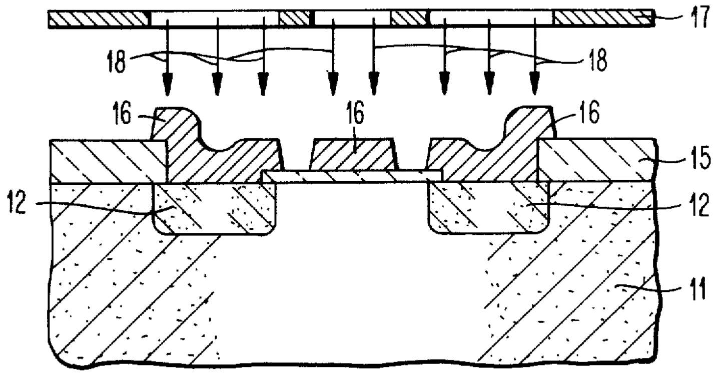
FIG. 3 is a sectional view, similar to FIG. 2, showing ion implantation in the metal electrode layers through a mask.

After deposition of the metal film 14 over the insulating layer 15, etching of the metal film 14 occurs with a suitable etchant to form metal electrode layers or lands 16 as shown in FIG. 2. Then, the non-doping ions are implanted into the metal electrode layers 16 by implantation through a mask 17, which is formed of a suitable material such as photoresist, for example, as indicated by arrows 18 in FIG. 3. This insures that the ions are directed only to the metal electrode layers 16.

While the mask 17 is preferably employed to implant the ions only in the metal electrode layers 16, it should be understood that the mask 17 does not have to be employed since the ions can penetrate the metal electrode layers 16 much easier than the insulating layer 15 of silicon dioxide or silicon nitride and silicon dioxide. Thus, it is not a requisite that the mask 17 be used with the method of the present invention during implantation of the ions.

If the ions are implanted in the metal film 14 before etching, the ions can be directed to all portions of the metal film 14. Of course, the mask 17 could be employed to control the ions so that they would only be directed to the portions of the film 14 that are to remain after etching to form the metal electrode layers 16.

If annealing of the semiconductor device 10 occurs after implantation of the ions, it is necessary that the annealing, which forms the ohmic contact of the metal electrode layers 16 to the source and drain regions 12, be maintained at a temperature no greater than 600° C. This is to insure that the damage to the crystal lattice structure of the metal electrode layers 16 by the implantation of the ions is not removed. The heating of the semiconductor device 10 to a temperature such as 800° C., for example, would result in all of the crystal lattice structure being repaired so that mobile ions would again be present in the metal electrode layers 16.

Annealing of the semiconductor device 10 to form the ohmic contact between the metal electrode layers 16 and the source or drain region 12 can occur prior to implantation of the ions in the metal film, if desired. When this occurs, it is immaterial as to the temperature to which the semiconductor device 10 is subjected insofar as preventing or reducing the presence of mobile ions in the metal electrode layers 16 is concerned since the damage to the crystal lattice structure by the implanted ions occurs after annealing.

Tests have been concluded on two MOS samples which were prepared on [100] N-type wafers having a resistivity of 1.0 ohm-cm. Each of the two wafers (1 and 2) had 500 A of thermal oxide grown thereon at 970° C. in dry oxygen. Then, a twenty mil dot of aluminum was evaporated and sintered at 425° C. for 20 minutes in a forming gas, which comprised 90 to 95 percent nitrogen with the remainder being hydrogen.

Then, the number of sodium ions in each of wafers 1 and 2 was determined through measuring the area of the mobile ion peak in the standard I-V loop. The number of fast surface state ions was ascertained through measuring the area of the dip in the standard I-V loop.

Each of wafers 1 and 2 had a sodium ion concentration of less than $10^{10}$ with the number of fast surface state ions being $3.4 \times 10^{11}$ in wafer 1 and $3.3 \times 10^{11}$ in wafer 2. The low concentration of sodium ions was not electrically measurable since any concentration less than $10^{10}$ is such as not to affect the electrical characteristics of the device.

After ascertaining the number of sodium ions and the number of fast surface state ions in wafers 1 and 2, each of wafers 1 and 2 had the aluminum dots stripped off. Then, aluminum dots were redeposited from an evaporator, which was known to be contaminated, to a thickness of one micron. Each of the wafers was then annealed for 20 minutes in nitrogen at 450° C.

Wafers 1 and 2 were again tested. The number of sodium ions was greater than $6.8 \times 10^{11}$ in wafer 1 and was $4.5 \times 10^{11}$ in wafer 2. Wafer 1 had $3.9 \times 10^{11}$ fast surface states and wafer 2 had $3.2 \times 10^{11}$ fast surface states.

Each of wafers 1 and 2 was then divided into four quarters. The quarters of wafer 1 will be identified as 1A, 1B, 1C, and 1D while the quarters of wafer 2 will be identified as 2A, 2B, 2C, and 2D.

Implantation with different dosages of hydrogen ($H_2^+$) at 110 keV then occurred. The number of sodium ions ($N_a^+$), the number of fast surface states ($N_{FS}$), the implant dose in ions/cm², and the post-implant anneal for each of wafers 1A, 1B, 1C, 1D, 2A, 2B, 2C, and 2D are as follows:

| Wafer No. | Implant Dose | $N_a^+$ | $N_{FS}$ | Post-Implant Anneal |
|---|---|---|---|---|
| 1A | $1 \times 10^{13}$ | less than $10^{10}$ | $7.2 \times 10^{11}$ | None |
| 1B | $1 \times 10^{13}$ | less than $10^{10}$ | $7.2 \times 10^{11}$ | 20 minutes in nitrogen at 425° C. |
| 1C | $5 \times 10^{12}$ | less than $10^{10}$ | $6.5 \times 10^{11}$ | 20 minutes in nitrogen at 425° C. |
| 1D | $5 \times 10^{12}$ | $2 \times 10^{10}$ | $6.8 \times 10^{11}$ | 120 minutes in nitrogen at 450° C. |
| 2A | $6 \times 10^{13}$ | less than $10^{10}$ | $2.1 \times 10^{12}$ | 120 minutes in nitrogen at 450° C. |
| 2B | $1 \times 10^{13}$ | less than $10^{10}$ | $8.2 \times 10^{11}$ | 120 minutes in nitrogen at 450° C. |
| 2C | $5 \times 10^{12}$ | less than $10^{10}$ | $5.7 \times 10^{11}$ | 120 minutes in nitrogen at 450° C. |
| 2D | $1 \times 10^{12}$ | $4 \times 10^{10}$ | $4.0 \times 10^{11}$ | 120 minutes in nitrogen at 450° C. |

As the data for wafers 1A and 1B discloses, neither the number of sodium ions nor the number of fast surface states is changed when annealing at 425° C. Thus, this shows that properly selected annealing temperature will not increase the number of sodium ions or the number of fast surface states after ion implantation.

As shown by wafers 1C and 1D, an increase of only 25° C. in the annealing temperature produces a significant increase in the number of sodium ions even though both had the same implant doage. Thus, even though the concentration of the implant dosage of ions is controlled, it also is necessary to control the annealing temperature if annealing occurs after ion implantation.

As shown for wafer 2, for example, an increase in the concentration of implant ions increases the number of the fast surface states. It is not known why this occurs, but it is believed to relate to the dosage concentration being too high so that implanted ions were left over to freely move to the surface.

As shown by wafer 2D, the number of sodium ions increases if the implant dosage concentration is too low. Thus, there must be selection of the implant dosage to control both the number of sodium ions and the number of fast surface states.

In view of the elimination of mobile ions when the dosage is selected and the annealing temperature is controlled, the method of the present invention produces a stable FET. That is, the same voltage bias will always produce the same current.

To obtain a specific fast surface state density and the desired number of sodium ions in the metal electrode layers in an FET, it is necessary to select the dosage, the ion, the energy level at which the ion is implanted, and the annealing temperature if annealing occurs after implantation. By controlling these, one is able to produce a stable FET.

While the present invention has described the method as being employed with an FET, it should be understood that it could be employed with any semiconductor device in which it is desired to remove mobile ions. Furthermore, while the various tests discussed only sodium ions, it should be understood that the method of the present invention may be used to reduce the number of mobile ions, which are alkaline metal ions. In addition to sodium, examples of the alkaline metal ions are lithium and potassium.

Although the tests were made on wafers with insulating layers of a particular material on a silicon substrate, it should be understood that the method of the present invention has utility with any semiconductor substrate having an insulating layer thereon. Likewise, any suitable metal other than aluminum or aluminum-copper could be employed.

An advantage of this invention is that it is a less costly method of producing a metal film without mobile ions for a semiconductor device, particularly an FET. Another advantage of this invention is that it insures that mobile ions are not present in a metal film. A further advantage of this invention is that a relatively short period of time is required to implant the ions to remove the mobile ions from the metal film.

While the invention has been particularly shown and described with reference to a preferred embodiment thereof, it will be understood by those skilled in the art that various changes in form and details may be made therein without departing from the spirit and scope of the invention.

What is claimed is:

1. A method of manufacturing a semiconductor device having a substrate of a semiconductor material with an insulating layer thereon and a metal film overlying the insulating layer and in contact with at least one portion of the substrate to form an electrode layer including the steps of:

implanting ions into the metal film;

selecting the ions from the group consisting of hydrogen, helium, silicon, neon, argon, carbon, aluminum, nitrogen, oxygen, copper, gold, xenon, and krypton;

selecting the dosage of the ions to prevent an increase in the fast surface state density;

and controlling the energy level of the ions to position all of the implanted ions within the metal film.

2. The method according to claim 1 in which the semiconductor material is silicon and the metal film includes at least aluminum.

3. The method according to claim 2 including:

removing portions of the metal film to form at least one electrode layer prior to implantation of the ions in the metal film; and controlling the implantation of the ions to implant the ions only in the electrode layer.

4. The method according to claim 3 in which control of implantation of the ions only in the electrode layer is accomplished by directing the ions through a mask.

5. The method according to claim 4 including annealing the metal film after ion implantation at a temperature at which all damage to the lattice structure created by implanting the ions is not removed.

6. The method according to claim 2 in which the metal film consists of only aluminum.

7. The method according to claim 2 in which the metal film includes any of the group consisting of aluminum, copper, and aluminum with copper.

8. The method according to claim 2 in which the ions are hydrogen.

9. The method according to claim 1 including:

removing portions of the metal film to form at least one electrode layer prior to implantation of the ions in the metal film; and controlling the implantation of the ions to implant the ions only in the electrode layer.

10. The method according to claim 9 in which control of implantation of the ions only in the electrode layer is by directing the ions through a mask.

11. The method according to claim 1 in which the semiconductor device is a field effect transistor.

12. The method according to claim 1 in which the ions are hydrogen.

13. The method according to claim 1 including annealing the metal film after ion implantation at a temperature at which all damage to the lattice structure created by implanting the ions is not removed.

* * * * *